(12) United States Patent
Anchan et al.

(10) Patent No.: US 8,495,363 B2
(45) Date of Patent: Jul. 23, 2013

(54) SECURING MESSAGES ASSOCIATED WITH A MULTICAST COMMUNICATION SESSION WITHIN A WIRELESS COMMUNICATIONS SYSTEM

(75) Inventors: Kirankumar Anchan, San Diego, CA (US); Hamsini Bhaskaran, San Diego, CA (US); Alexander Gantman, San Diego, CA (US); Patrick J. Hughes, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 12/751,538

(22) Filed: Mar. 31, 2010

(65) Prior Publication Data

US 2010/0257365 A1    Oct. 7, 2010

Related U.S. Application Data

(60) Provisional application No. 61/166,617, filed on Apr. 3, 2009.

(51) Int. Cl.
*H04L 29/06* (2006.01)

(52) U.S. Cl.
USPC ........................................................ 713/163

(58) Field of Classification Search
USPC ........................................................ 713/163
See application file for complete search history.

(56) References Cited

U.S. PATENT DOCUMENTS

| | | | |
|---|---|---|---|
| 2002/0141591 A1* | 10/2002 | Hawkes et al. | 380/278 |
| 2005/0010774 A1* | 1/2005 | Rose et al. | 713/171 |
| 2005/0026607 A1 | 2/2005 | Hwang et al. | |
| 2009/0092254 A1* | 4/2009 | Lee et al. | 380/278 |

FOREIGN PATENT DOCUMENTS

WO    2008034362 A1    3/2008

OTHER PUBLICATIONS

International Search Report and Written Opinion—PCT/US2010/029816, International Search Authority—European Patent Office—Aug. 5, 2010.
QUALCOMM: "Explanation of BAK-based key management" SRD Generation Partnership Project (3GPP) Draft; S3-030040_MBMS_CONTENTPROTECTION_CR, Feb. 20, 2003, XP050273312.
Security of Multimedia Broadcast/Multicast Service (MBMS) SRD Generation Partnership Project (3GPP) Standard; 3GPP TS 33.246 V8.3.0, Mar. 2009, XP050376813.

* cited by examiner

*Primary Examiner* — Shaun Gregory
(74) *Attorney, Agent, or Firm* — Raphael Freiwirth (57) ABSTRACT

In an embodiment, a server determines to update at least one group session key (GSK) parameter for a given multicast group, the at least one GSK parameter configured to permit encryption, decryption and/or authentication of multicast messaging exchanged between members of the given multicast group during a multicast communication session. The server sends a notification to a plurality of multicast group members of the given multicast group that an update of the at least one GSK parameter for the given multicast group is available. At least one of the multicast group members receives the notification and sends a provisioning request to retrieve the updated at least one GSK parameter, the provisioning request including information specific to the given multicast group member. The server generates and encrypts the updated at least one GSK parameter and sends the encrypted at least one GSK parameter to the at least one multicast group member.

32 Claims, 8 Drawing Sheets

Conventional Unicast Key Distribution Process

SECURING MESSAGES ASSOCIATED WITH A MULTICAST COMMUNICATION SESSION WITHIN A WIRELESS COMMUNICATIONS SYSTEM

CLAIM OF PRIORITY UNDER 35 U.S.C. §119

The present Application for Patent claims priority to Provisional Application No. 61/166,617, entitled "SECURING MESSAGES ASSOCIATED WITH A MULTICAST COMMUNICATION SESSION WITHIN A WIRELESS COMMUNICATIONS SYSTEM", filed Apr. 3, 2009, which is assigned to the assignee hereof and hereby expressly incorporated by reference herein in its entirety.

BACKGROUND OF THE INVENTION

1. Field of the Invention

The invention relates to securing messages associated with a multicast communication session within a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communication network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a given cell, etc.), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The 3$^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

In an embodiment, a server determines to update at least one group session key (GSK) parameter for a given multicast group, the at least one GSK parameter configured to permit encryption, decryption and/or authentication of multicast messaging exchanged between members of the given multicast group during a multicast communication session. The server sends a notification to a plurality of multicast group members of the given multicast group that an update of the at least one GSK parameter for the given multicast group is available. At least one of the multicast group members receives the notification and sends a provisioning request to retrieve the updated at least one GSK parameter, the provisioning request including information specific to the given multicast group member. The server generates and encrypts the updated at least one GSK parameter and sends the encrypted at least one GSK parameter to the at least one multicast group member.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

Figure 1:
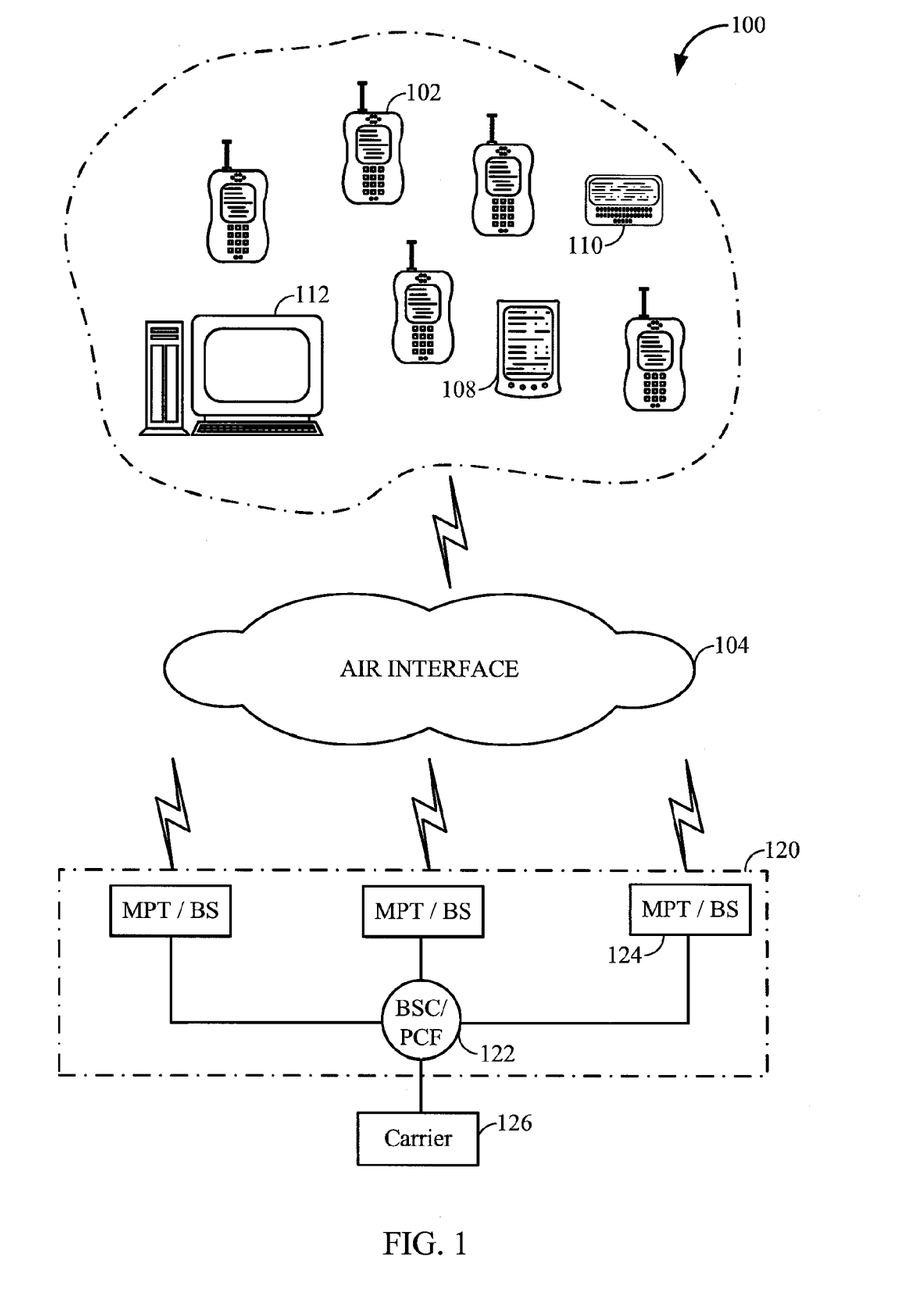
FIG. 1 is a diagram of a wireless network architecture that supports access terminals and access networks in accordance with at least one embodiment of the invention.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2A:
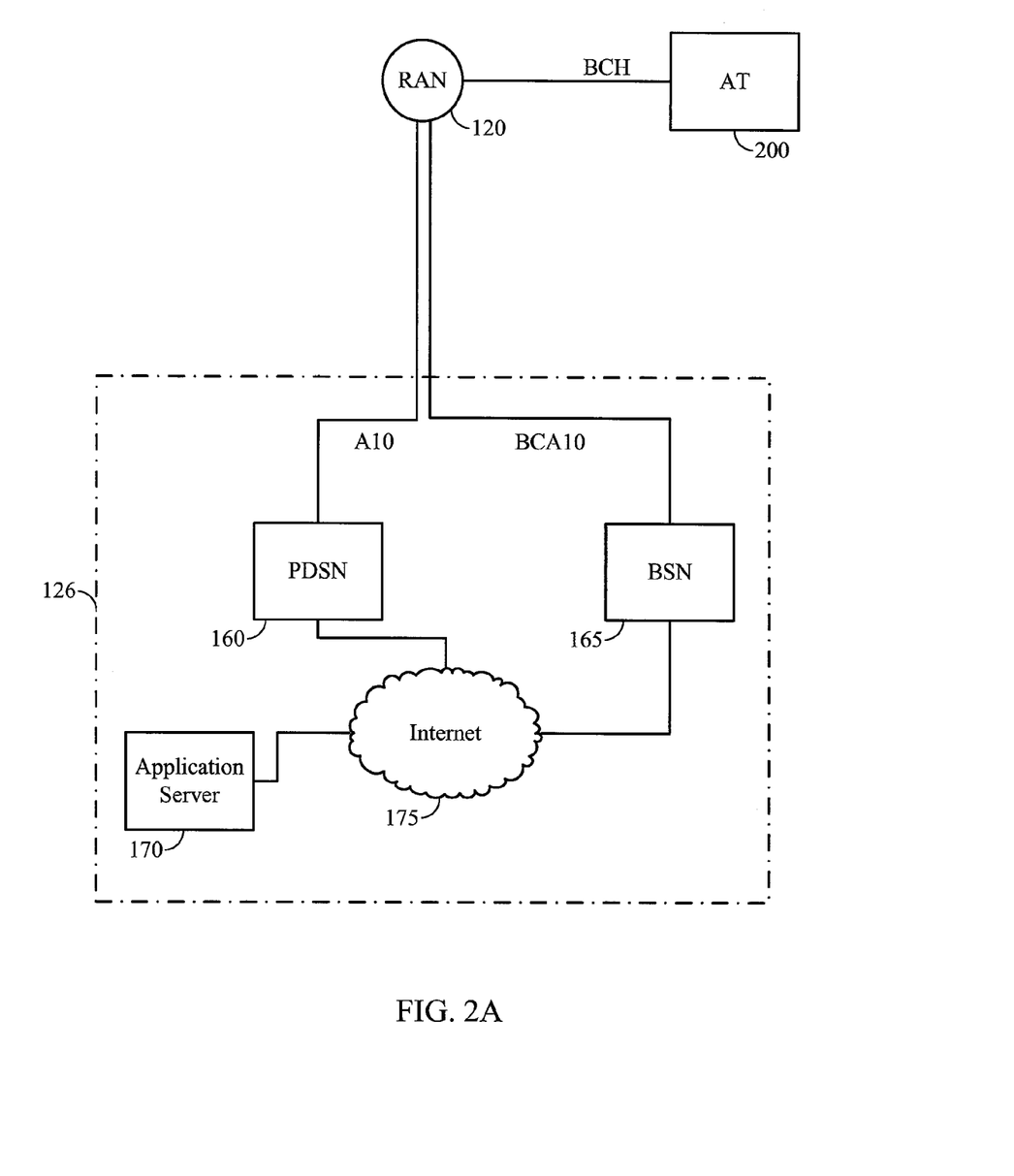
FIG. 2A illustrates the carrier network according to an embodiment of the present invention.

FIG. 2A illustrates the carrier network 126 according to an embodiment of the present invention. In the embodiment of FIG. 2A, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2A, the PDSN 160 may communicate with the RAN 120 (e.g., the BSC/PCF 122) via a conventional A10 connection. The A10 connection is well-known in the art and will not be described further for the sake of brevity.

Referring to FIG. 2A, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 2B:
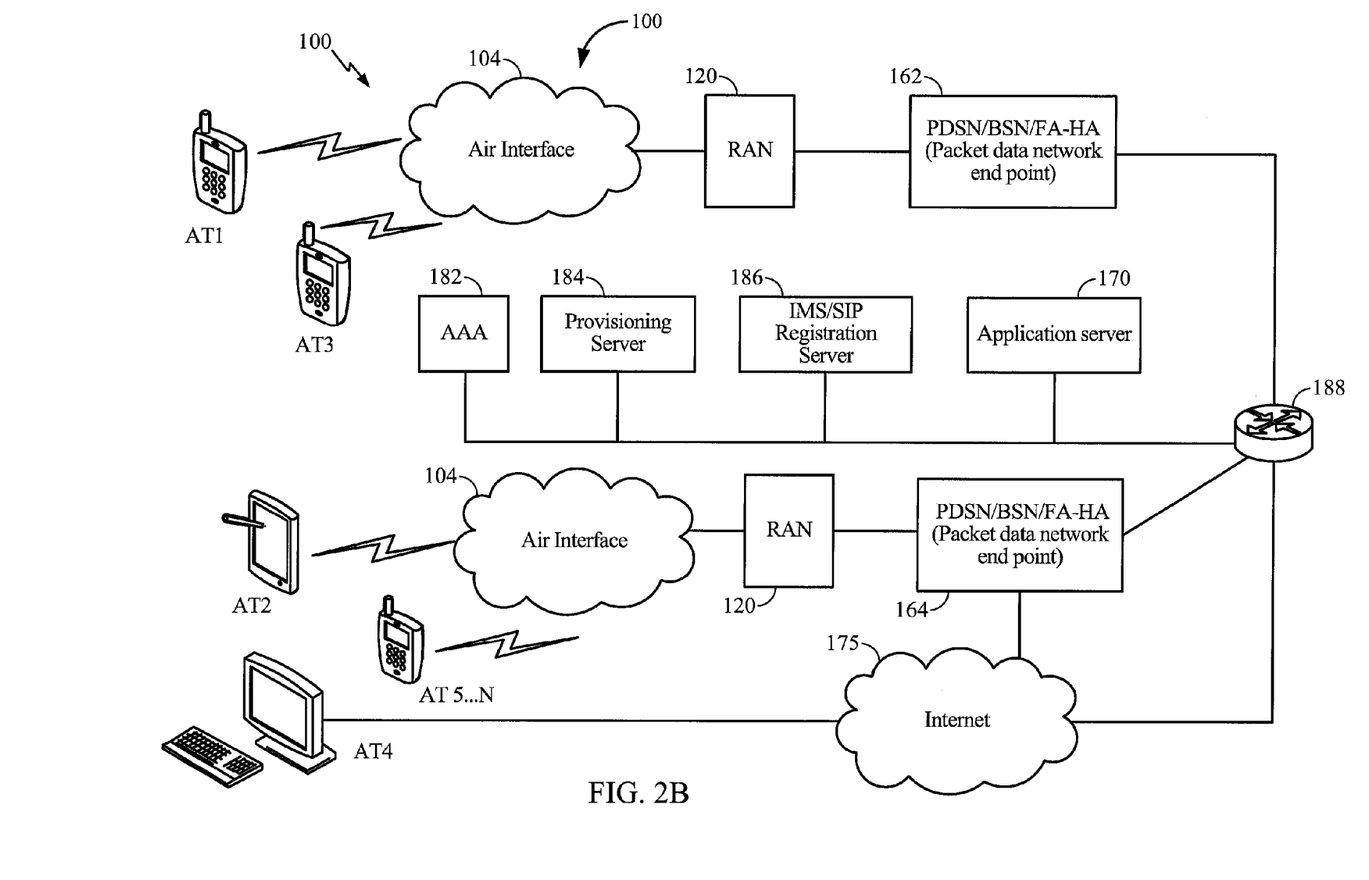
FIG. 2B illustrates an example of the wireless communication 100 of FIG. 1 in more detail.

FIG. 2B illustrates an example of the wireless communication 100 of FIG. 1 in more detail. In particular, referring to FIG. 2B, ATs 1 ... N are shown as connecting to the RAN 120 at locations serviced by different packet data network endpoints. Accordingly, ATs 1 and 3 connect to the RAN 120 at a portion served by a first packet data network end-point 162 (e.g., which may correspond to PDSN 160, BSN 165, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. ATs 2 and 5 ... N connect to the RAN 120 at a portion served by a second packet data network end-point 164 (e.g., which may correspond to PDSN 160, BSN 165, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. AT 4 connects directly to the Internet 175, and through the Internet 175 can then connect to any of the system components described above.

Referring to FIG. 2B, ATs 1, 3 and 5 ... N are illustrated as wireless cell-phones, AT 2 is illustrated as a wireless tablet-PC and AT 4 is illustrated as a wired desktop station. However, in other embodiments, it will be appreciated that the wireless communication system 100 can connect to any type of AT, and the examples illustrated in FIG. 2B are not intended to limit the types of ATs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Figure 3:
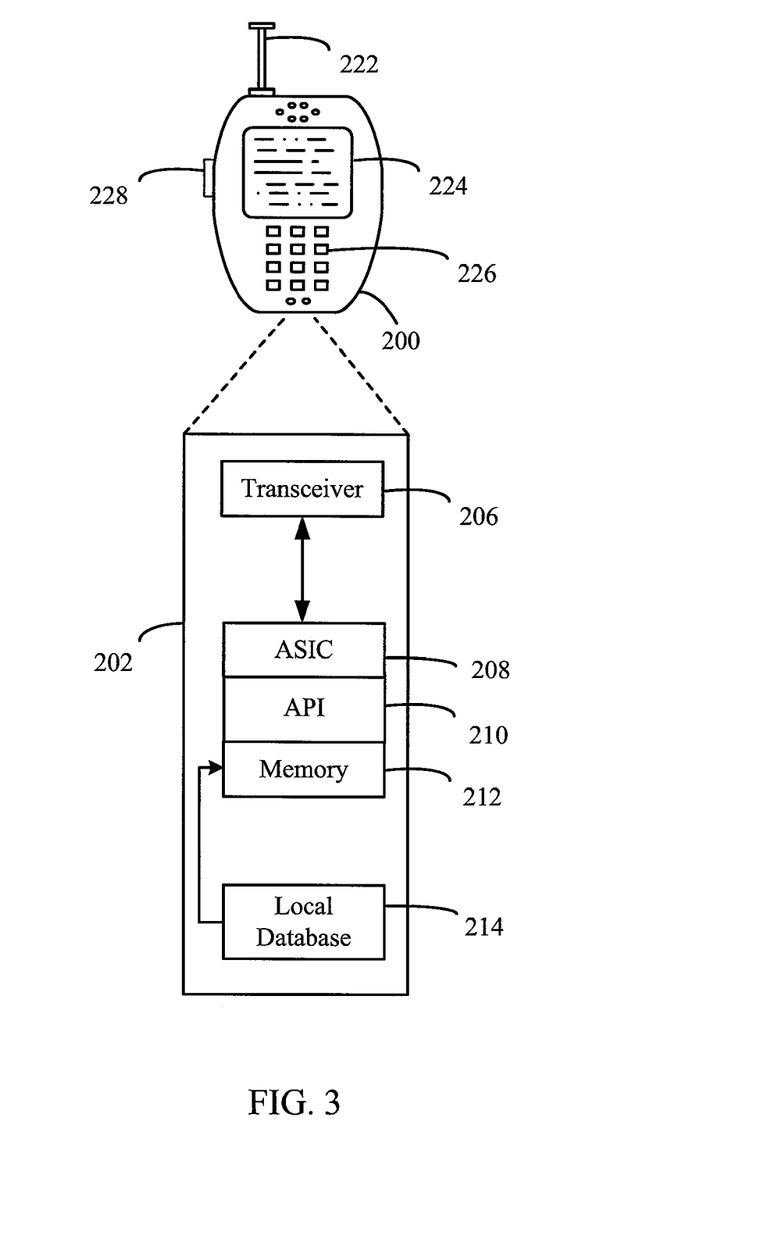
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

As discussed in the Background section, multicast messaging may be performed in a number of ways. In order to better understand embodiments of the present invention, a conventional unicast key distribution process for use in a conventional multicast messaging process will be described with respect to FIG. 4. Then, a multicast messaging process wherein a set of prospective sectors which are likely to include one or more multicast members is established before multicast session initiation will be described according to embodiments of the present invention.

If two or more of ATs 1 . . . N within the system 100 as illustrated in FIG. 2B wish to exchange information with each other, a communication session (e.g., a half-duplex push-to-talk (PTT) call over multicast, a VoIP full-duplex call and/or any other form of IP-based packet data exchange) can be established to facilitate the data transfer between the respective ATs. To increase the security of a communication session, individual IP data packets can be authenticated and/or encrypted after a key used for authentication and/or encryption and decryption is shared by the parties involved in the communication session. For example, a Diffie-Hellman key exchange process can be used to permit two parties that have no prior knowledge of each other to jointly establish a shared secret key over an insecure communications channel.

However, key-exchange procedures, such as the Diffie-Hellman key-exchange protocol, can have several drawbacks when applied to a group communication session (e.g., a communication session that potentially involved more than two ATs). As an initial matter, as with any exchange of 'secret' information over an unsecure communications channel, it is possible that the Diffie-Hellman key exchange protocol is susceptible to a man-in-the-middle-attack, which means a hacker can potentially intercept messaging in different directions of the communication session and can then monitor the session and/or masquerade as a legitimate call participant. Also, because group communication sessions can potentially include a very high number of call participants, implementing the Diffie-Hellman key exchange protocol can become computationally intensive and bandwidth inefficient in group communication sessions because each call participant is required to exchange multiple authentication credentials to derive the same key independently of one another.

Conventionally, those of skill in the art have attempted to mitigate the above-noted problems associated with the Diffie-Hellman key exchange protocol as applied to group communication sessions with improved digital certificates management. However, managing digital certificates adds complexity to the communication system for large groups, and the numerous round-trip delays associated with message-exchange in support of the digital certificate management makes digital certificate management inefficient for large groups.

Accordingly, embodiments of the invention are directed to group key distribution to access terminals that belong to a particular multicast group within a wireless communications system. As will be described below, one or more of the embodiments permits a group session key (GSK) to be distributed to each multicast group member for use in authentication and decryption of multicast transmissions for a multicast session. The multicast authentication process relies, in part, upon a conventional unicast key distribution process like key generation based on a pre-provisioned shared secret similar to SIP authentication (e.g., a TCP/IP-based application layer protocol that is commonly used for setup up and tearing down multimedia communication sessions), which is described in more detail next with respect to FIG. 4. While FIG. 4 is described with respect to SIP, it will be appreciated that other embodiments can be implemented in accordance with protocols other than SIP.

Figure 4:
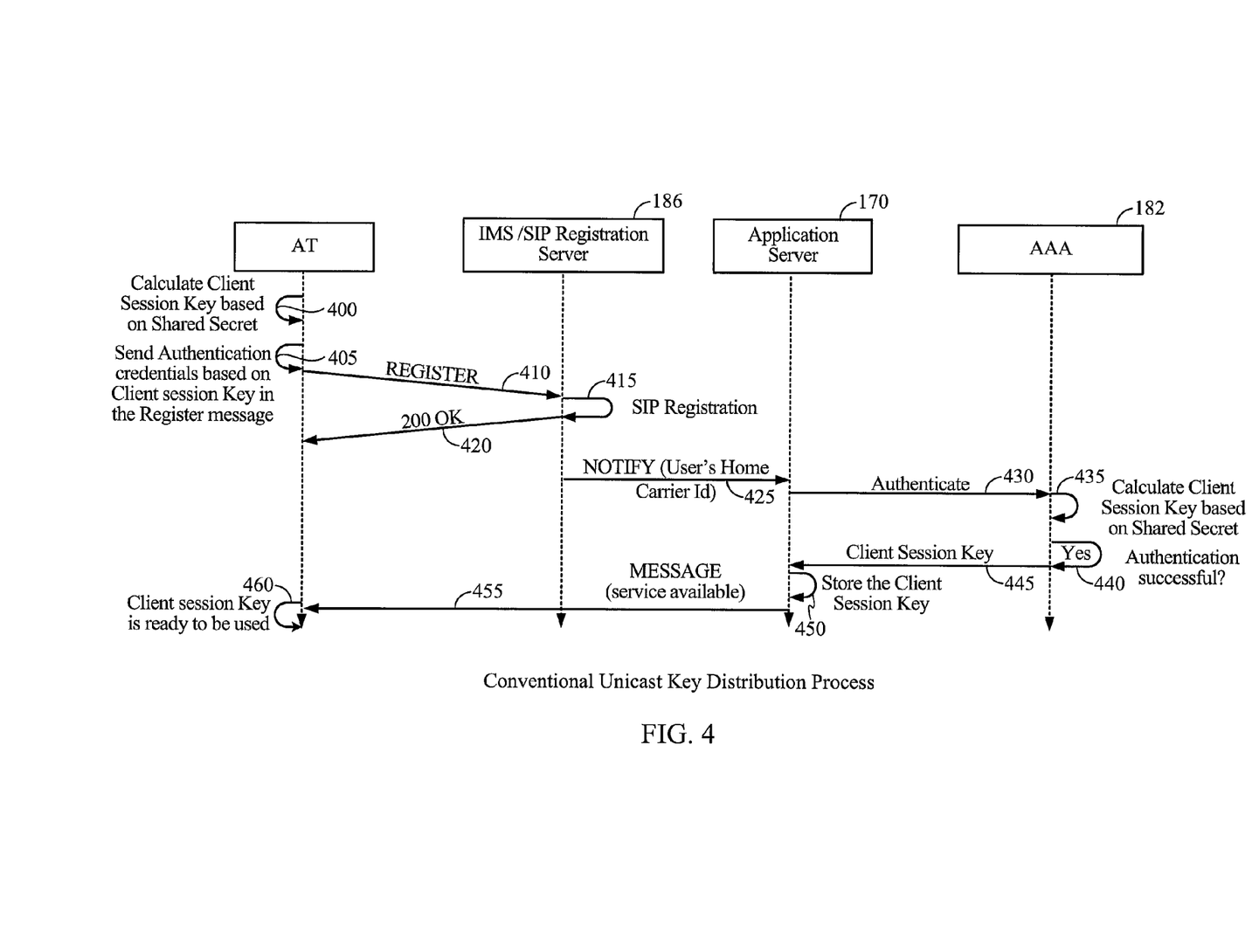
FIG. 4 illustrates a conventional unicast key distribution process.

Referring to FIG. 4, assume that a given AT is pre-provisioned with a shared secret that is shared with the AAA 182. The shared secret is called the Base Application Key (BAK). Accordingly, the given AT calculates a client session key based on the shared secret (BAK) for authenticating communications for a particular unicast communication session using the HMAC algorithm with the BAK and the user credentials as the inputs to the algorithm, 400. The given AT then sends authentication credentials including a message digest based on the client session key within a register message to the IMS/SIP Registration Server 186 via the RAN 120, 410 along with application specific headers in the SIP Register message. The register message is used by the given AT, or SIP user agent (UA), to convey its current IP address and the URLs for which the given AT would like to receive calls. The IMS/SIP Registration Server 186 registers the given AT, 415, and acknowledges the registration with a 200 OK message, 420. The IMS/SIP Registration Server 186 then forwards a notify message with the message digest and the user credentials received from the AT to the application server 170 including a home-carrier identifier (ID) for the given AT, 425.

Notify messages are sent to inform subscribers or subscription managers of changes in state to which the subscriber has a subscription.

The application server 170 then forwards the message digest and the user credentials to the AAA 182 and requests authentication of the given AT from the AAA 182, 430. The AAA 182 calculates the client session key for the given AT based on the shared secret (BAK) and user credentials and using the same HMAC algorithm as the Client, 435. The AAA 182 performs an authentication check for the given AT by computing the message digest based on the client session key and comparing it to the message digest received from the AT, 440. If the message digests match, then the AT is authenticated and the client session key is to be used for the future transactions, 440. Accordingly, both the given AT and the AAA 182 are assumed to be pre-provisioned with the shared secret key, which is later used to calculate the client session key, before the process of FIG. 4 is initiated.

After authenticating the client in 440, the AAA 182 forwards the client session key for the given AT to the application server 170, and the application server 170 stores the client session key, 450. The application server 170 then sends a message indicating that service is available to the given AT, 455, and the given AT is thereafter aware that the client session key can be used such that media can begin to be exchanged between the given AT and the application server 170 using the client session key for unicast authentication. Accordingly, by applying a unicast authentication policy, the given AT and the application server 170 can exchange packets authenticated with the client session key, that is now shared by the both the given AT and the application server 170.

Figure 5:
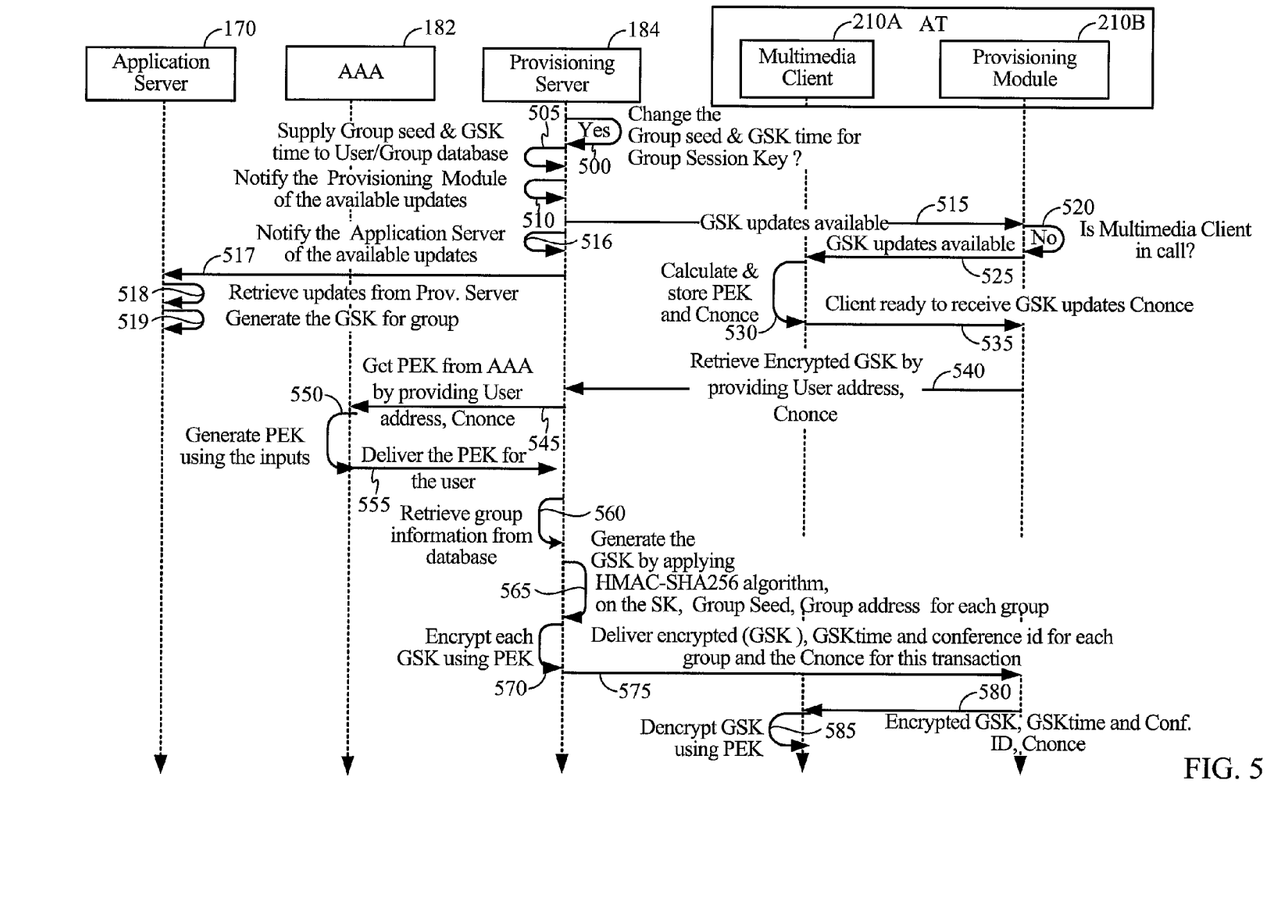
FIG. 5 illustrates a multicast key distribution process in accordance with an embodiment of the invention.

FIG. 5 illustrates a multicast key distribution process according to an embodiment of the present invention. In FIG. 5, assume that the provisioning server 184 and the application server 170 have a secret key (SK) known only to the provisioning server 184 and the application server 170, and that the AAA 182 and the given AT have a shared secret, (e.g., Base Application Key (BAK)). It may further be assumed that the given AT corresponds to AT 200 of FIG. 3, and includes a multimedia client 210A and a provisioning module 210A each included among APIs 210, and having the functionality described below with respect to FIG. 5.

Referring to FIG. 5, the provisioning server 184 determines whether to generate or update a group seed and a group session key (GSK) time of a given GSK for a particular closed multicast group which is described in more detail after the description of FIG. 5. As used herein, a 'closed' multicast group is any multicast group that restricts its participants, such that media-encryption and the lower layer signaling is used to block restricted ATs from monitoring associated multicast sessions involving the closed multicast group. The closed multicast group also refers to a group which is identified by a unique group address (e.g., a SIP Uniform Resource Locator) and a conference ID wherein the members of the group form a fixed member list before the multicast call is started and the member list does not change for the duration of the call. Note that the participant list (members actively participating in the call) may change during the call.

The secret key corresponds to a private key known at the provisioning server 184 and made available to the application server 170), but is not shared with the multicast group members. The GSK time corresponds to a future time period where the GSK is valid for encryption and/or decryption of media and authentication of signaling for the closed multicast group, and can be input by an operator of the provisioning server 184 to establish a validity duration or period for the new GSK. In an example, the group seed could either be automatically generated by a cryptographically random number generator at the provisioning server 184, or alternatively can be manually entered by an operator of the provisioning server (e.g., as a 128 bit cryptographically random number). When a new group seed is generated for a given multicast group, a new group session key (GSK) is also generated for the given multicast group (e.g., as shown below, in block 565 at the provisioning server 184 and/or 519 at the application server 170). The new GSK is then distributed to each multicast group member of the given multicast group, as will be described below in more detail. In an example, the GSKs can be kept relatively small (e.g., 256 bits), such that the GSK can be transferred in a single transaction or message so as to reduce messaging within the system.

In 500 of FIG. 5, the provisioning server determines a need to change the GSK. This can be triggered based on the need to change the GSK as a result of group membership changes or based on the administrator's periodic key update policy to update the keys to improve security or based on a the feedback mechanism between the provisioning server and the multimedia clients to change the key triggered when the number of failures in decrypting/authenticating multicast media crosses a preset threshold number. Based on one of the triggers assume that the provisioning server 184 determines to update both the group seed for the given multicast group and the GSK time for the given multicast group. The provisioning server chooses a GSK time based on the criticality of the GSK update. In case the events are non critical, the provisioning server chooses a GSK time that is typically beyond the network peak hours. Accordingly, the provisioning server 184 stores the new group seed and GSK time corresponding to the group address, in a user/group database, 505. In an example, the user/group database corresponds to a secure database that is maintained at the provisioning server 184 or the application server 170, and is accessible by both components. The application server 170 only reads from the database, where as the provisioning server 184 can write to the database.

In 510 and 516 of FIG. 5, based on the GSK time, the provisioning server schedules and sends a GSK update notification. For example, since the GSK time indicates a value beyond which the GSK is valid, the provisioning server 184 chooses a notification schedule that takes into account at least the following constraints: in order to allow the multimedia clients to obtain the GSK updates, the scheduled notification time is well in advance of the GSK time; and the scheduled notification time is during network non-peak hours to try to reduce and/or prevent wastage of network resources during peak hours resulting from the GSK update transaction originating from the sizable number of members in each multicast group. The provisioning server 184 then determines to notify the provisioning module 210B of each member of the given multicast group that is registered with the application server 170 that an update related to the GSK of the given multicast group is available. Accordingly, the provisioning server 184 sends a notification to the provisioning module 210B of the given AT (e.g., and any other ATs registered with the application server 170 to the given multicast group) that indicates the availability of a GSK update, 515.

Likewise, in 516, the provisioning server 184 determines to notify the application server 170 that a GSK-update is available for one or more multicast groups. The application server 170 retrieves the updated group seed and GSK time for the corresponding group address from the user/group database, 518, and generates the new GSK(s) for each multicast group that requires an update, 519 (e.g., in a manner similar to that of 565 at the provisioning server 184, which is described below in greater detail). As will be appreciated by one of ordinary skill in the art, the application server 170 has access to the user/group database, and as such computing the new GSK is a relatively simple matter. However, for security reasons, the individual multicast group members cannot access the user/group database, and as such the GSK is distributed to the multicast group members in a different manner as will be described below in more detail.

After the provisioning module 210B of the given AT receives the GSK update notification from 515, the provisioning module 210B determines whether the multimedia client is currently engaged in a call, 520, and if not, notifies the multimedia client 210A that an updated GSK and associated GSK time are available for download from the provisioning server 184, 525. While not shown explicitly within FIG. 5, if the multimedia client 210A is engaged in a call, either the provisioning module 210B will wait for the call to complete before notifying the multimedia client 210A of the GSK-update, or the provisioning module 210B will provide the notification to the multimedia client 210A and the multimedia client 210A will then wait until the call completes before attempting to update the GSK information.

The multimedia client 210A of the given AT receives the GSK-update notification from the provisioning module 210B, and then calculates and stores a private encryption key (PEK) as well as a client-number-used-once (Cnonce), 530. The PEK is calculated using the shared secret (BAK), the Cnonce value along with the given AT's user credentials by applying the Hash-based Message Authentication Code (HMAC)-Secure Hash Algorithm (SHA) 256 algorithm, 530. Also in 530, the multimedia client 210A de-registers itself from the application server 170 by sending a deregistration message to the application server 170. The multimedia client de-registers because the multimedia client 210A now knows that its current GSK may no longer be valid, as inferred from receipt of the GSK-update notification. The multimedia client 210A informs the provisioning module 210B that the multimedia client 210A is ready to receive the GSK update(s), and also passes the Cnonce, 535.

The provisioning module 210B at the given AT then sends a provisioning request to the provisioning server 184 to request the new GSK and GSK time, 540. The provisioning request sent in 540 includes one or more credentials of the given AT's user for the group multimedia service (e.g., a primary address of the given AT's user for the group multimedia service), and further includes the Cnonce generated in 530. Upon receiving the provisioning request from the provisioning module 210B, the provisioning server 184 requests, 545, the AAA 182 to provide the PEK corresponding to the given AT (e.g., or a user of the given AT) and provides the AAA 182 the credentials of the given AT's user as included in the provisioning request from 540 (e.g., a username for the given AT's user) and the Cnonce value generated in 530).

The AAA 182 then calculates the PEK using the shared secret (BAK), the Cnonce, along with the given AT's user credentials by applying the HMAC-SHA 256 algorithm for the given AT's user, 550, (e.g., resulting in the same PEK as calculated at the multimedia client 210A in 530) and returns the calculated PEK to the provisioning server 184, 555. As will be appreciated by one of ordinary skill in the art, one PEK is required per GSK update transaction. If multiple GSKs are to be encrypted for distribution to the given AT for different multicast groups, the same PEK (i.e., from 550 and 555) is used for encrypting each of the GSKs for that particular AT. Note that the same shared secret (BAK) could also be used to calculate the unicast client session key, U-CSK, as shown in FIG. 4.

Upon receiving the PEK from the AAA 182, the provisioning server 184 retrieves information related to the given multicast group (e.g., the multicast group's IP address, the new or updated group seed and GSK time stored in 505, the secret key (SK), etc.) from the user/group database, 560. Then, in 565, the provisioning server 184 generates the new GSK based on (i) the secret key (SK) known only to the provisioning server 184 (e.g., and available to the application server 170 as well), (ii) the group seed stored in 505 and retrieved in 560 and (iii) the group address for the given multicast group (e.g., the group's SIP like Uniform Resource Locator). In an example, the provisioning server 184 can generate the GSK by applying a HMAC-SHA256 algorithm, as is known in the art.

The provisioning server 184 then uses the PEK calculated by the AAA 182 as the encryption key for the given AT to encrypt the new GSK, 570. In an example, the encryption of 570 may be implemented by applying an Advanced Encryption Standard (AES) algorithm in an electronic code book (ECB) mode, as is known in the art. After encrypting the new GSK in 570, the provisioning server 184 sends one or more messages to the provisioning module 210B at the given AT that include (i) the encrypted GSK from 570, (ii) the associated GSK time from 505, (iii) a conference ID for the given multicast group (e.g., retrieved in 560) and (iv) the Cnonce that was initially supplied by the given AT in 540. As noted above, if multiple GSKs are to be distributed to the given AT for more than one multicast group, the one or more messages sent in 575 will include multiple encrypted GSKs each with their own associated GSK times, and a separate conference ID for each of the multicast groups. The Cnonce value is the same for each of the multicast groups, and as such only one Cnonce value is included even in the case of multiple GSK-distribution to a single AT.

After the provisioning module 210B receives the message(s) from 575, the provisioning module 210B informs the multimedia client 210A of the GSK, GSK time and conference ID of each updated multicast group, as well as the Cnonce value, 580. Upon receiving the encrypted GSK(s) from the provisioning module 210B in 580, the multimedia client 210A determines whether the Cnonce value received in 580 matches the Cnonce value generated in 530 and sent to the provisioning module 210B in 535, 585. If the multimedia client 210A determines the Cnonce values to match, the multimedia client 210A decrypts each GSK for each updated multicast group using the PEK calculated in 530, 585. The multimedia client 210A then stores each decrypted GSK and GSK time in association with the conference ID(s) of the related multicast group(s). While not shown in FIG. 5, the multimedia client 210B can then re-register itself to the group multimedia service by sending a register message to the application server 170 as shown in 410 of FIG. 4 and can decrypt multicast messages to one or more of the multicast groups with updated GSKs. Note that the Cnonce value from the client changes for every GSK update transaction. This ensures that PEK calculated for every transaction is different. As the GSK is encrypted using the PEK and since for each multimedia client the PEK is different, the encrypted GSK is different for each client. This makes it difficult for an intruder to reverse engineer the GSK by collecting samples of the encrypted GSK at various GSK update instances by snooping on an AT because both the inputs to the encryption algorithm (GSK and the PEK) change every time.

Figure 6A:
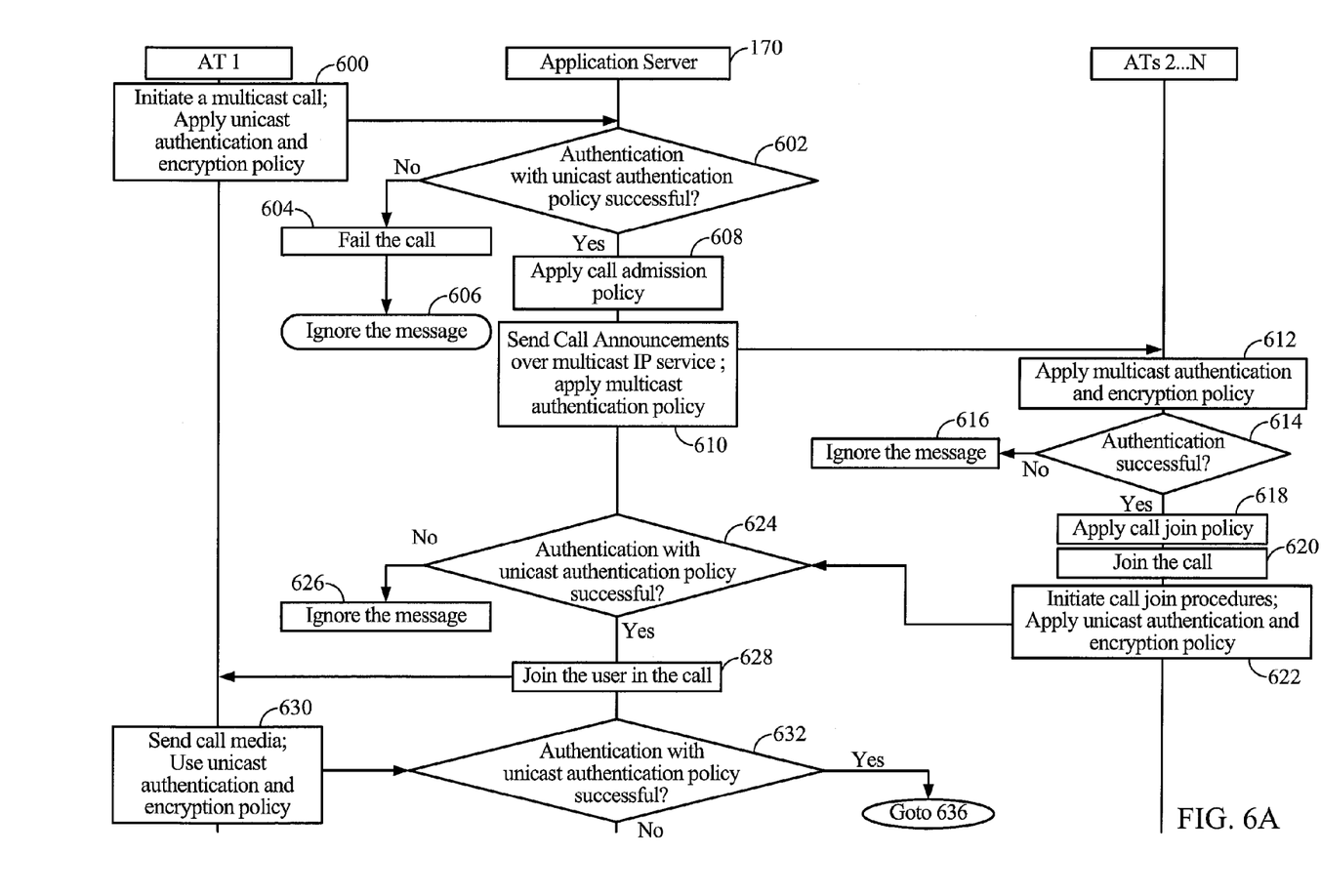
FIG. 6 illustrates a multicast communication session in accordance with an embodiment of the invention.
Figure 6B:
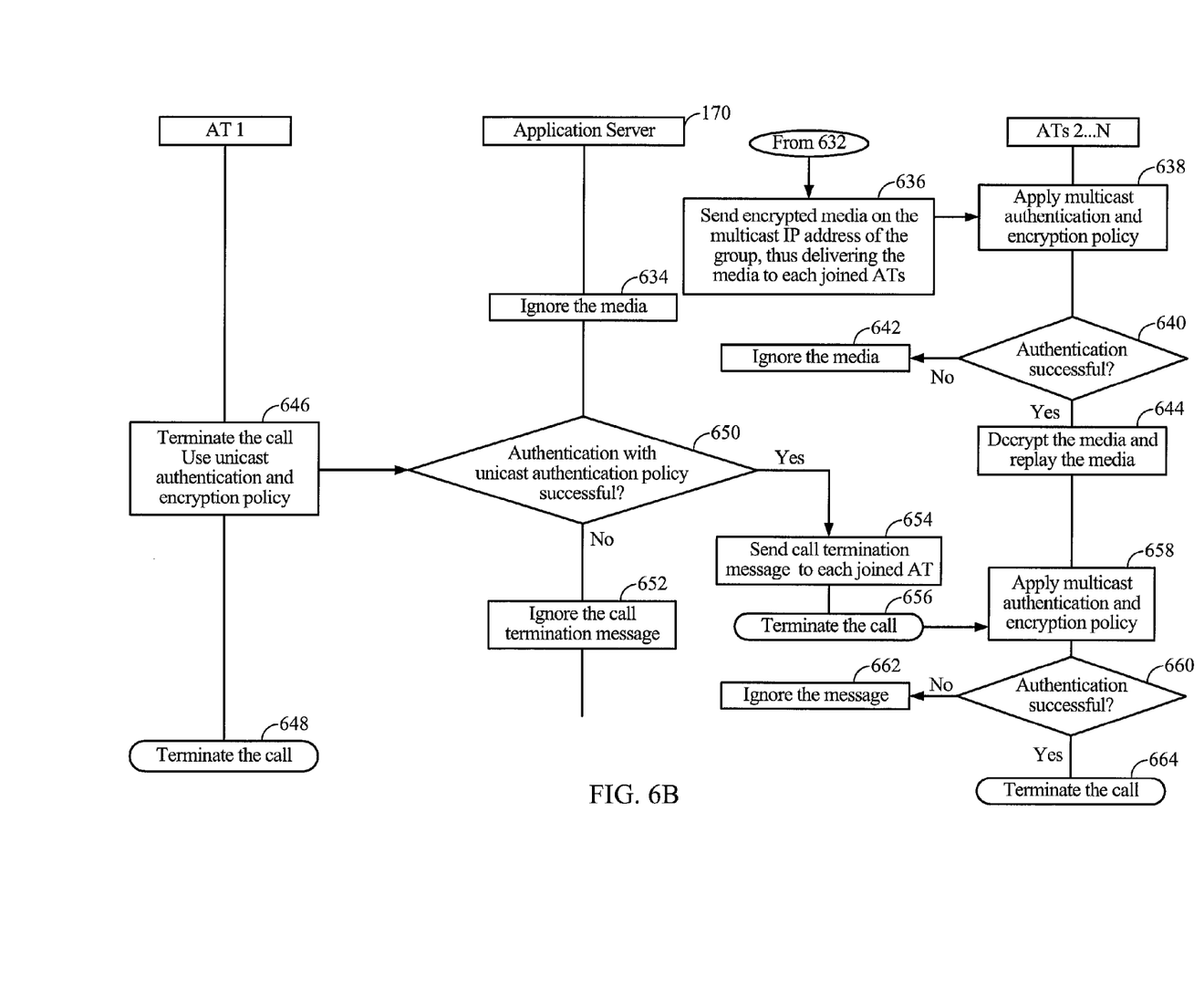

A multicast communication session that uses unicast keys as in FIG. 4 in conjunction with multicast keys or GSKs as in FIG. 5 will now be described in more detail with respect to FIG. 6. In FIG. 6, it may be assumed that the process of FIG.

4 has executed at a call originator (e.g., AT 1) and at target ATs 2 . . . N of the multicast communication session, and that the process of FIG. 5 has executed at ATs 1 . . . N of the multicast communication session. Accordingly, the call originator AT 1 has a unicast client session key (U-CSK) for authenticating the application signaling on a reverse link traffic channel (R-TCH) to be forwarded to the application server 170. Based on the application signaling from the originator AT, the application server 170 delivers signaling to the target ATs 2 . . . N, the target ATs 2 . . . N each have an up-to-date GSK by which ATs 2 . . . N can authenticate the signaling messages from the application server 170 and decrypt the forwarded or re-transmitted multicast media from the application server 170, and the application server 170 is aware of both U-CSKs for ATs 1 . . . N and the up-to-date GSK for the multicast group.

Referring to FIG. 6, the call originator AT 1 applies a unicast authentication policy based on the U-CSK to a call message, and then sends the call message over the R-TCH to the RAN 120, which is then forwarded to the application server 170, 600. In an example, applying the unicast authentication policy means adding a digital signature to the call message using the U-CSK as a key for the signature and sending this message to the application server 170. The application server 170 receives the call message, and attempts to authenticate the call message by applying the unicast authentication policy to the call message, 602. For example, the application server 170 can check the digital signature of the call message and determine whether a correct U-CSK was used to generate the digital signature. To avoid replay attacks, the digital signature also uses a timestamp element as another input. The Timestamp element provides the time the signature at the time, the message was generated and accounts for the transmission delay for the message to reach from the sender to the receiver and any drifts in the timing synchronization between the sender and the receiver. If the call message is not properly authenticated by the application server 170 in 602, the application server 170 fails the call, 604, and ignores the message, 606. Otherwise, if the call message is authenticated by the application server 170 in 602, the application server 170 applies the call admission policy for the requested multicast communication session, 608. For example, in 608, the application server 170 can confirm that AT 1 is part of the multicast group to which the session has been requested and/or can verify that the AT 1 has the necessary capabilities like the multimedia types supported for the call, and passes other call parameters like restrictions.

After applying the call admission policy in 608, the application server 170 applies the multicast authentication policy for the signaling based on the current GSK for the multicast session to an announce message for announcing the multicast session, and then forwards the announce message to the RAN 120 for transmission to target ATs 2 . . . N, 610. For example, the application server 170 can add a digital signature to the announce message using the GSK as a key for the signature and then the application server 170 can send this message to the target group members on the multicast service. The announce message with the digital signature can be authenticated with the GSKs at the individual target group members.

Each of ATs 2 . . . N use the common or shared GSK (e.g., obtained by the process of FIG. 5) to decrypt and or authenticate the multicast call announcement signaling message, 612. When the multicast messages are encrypted, the ATs use the GSK to decrypt the message. If authentication is enabled, the ATs use the GSK along with the message to generate the digital signature and compare the digital signature received in the message to verify authentication. If the authentication of 612 is not successful, ATs 2 . . . N ignore the message and do not respond to the multicast call announcement, 616. Otherwise, if the decryption and or authentication of 612 is successful, target ATs 2 . . . N apply a call join policy, 618. For example, each of target ATs 2 . . . N can prompt a user to determine whether or not the user wishes to join the announced multicast call. The call join policy may include checks for any restrictions against the call originator or the restrictions against a media type to be exchanged during the multicast session. When all checks are successful, the user of ATs 2 . . . N indicates a call join action call (e.g., by present an accept call button), ATs 2 . . . N determine to join the call, 620.

Accordingly, ATs 2 . . . N then initiate call join procedures and send one or more reverse link messages in order to join the call, 622. The one or more reverse link messages intended for the application server 170 include the digital signature generated using the message and the U-CSKs that are specific to each of ATs 2 . . . N in 622. Thus, in an example of 622, ATs 2 . . . N may send an announce acknowledge accept message to the application server 170 that is authentication in accordance with each of ATs 2 . . . N individual U-CSK. Also, while not shown in FIG. 6, ATs 2 . . . N can also send a BCMCS-FlowRegistration message to register with the RAN 120, and the BCMCSFlowRegistration message is not forwarded to the application server 170 and is not encrypted with the U-CSK or GSK. Alternatively while not shown in FIG. 6, some ATs may decide not to participate in the call based on the call join policy and may reject the call announcement by sending the announce reject message with the digital signature using their respective U-CSK.

The application server 170 receives the announce acknowledge accept messages from ATs 2 . . . N and applies the unicast authentication policy to each received message from ATs 2 . . . N, as in 602 with respect to AT 1, 624. If any of the messages from ATs 2 . . . N are not properly authenticated in 624, the unauthenticated messages are ignored in 626. Otherwise, the application server 170 adds the requesting (and properly-authenticated) ATs to the call in 628. Also, after a first responder joins the call, the application server 170 indicates, to call originator AT 1, that AT 1 has the floor and can begin speaking.

Accordingly, AT 1 begins transmitting call media on the R-TCH to the RAN 120, which is forwarded to the application server 170 for transmission to the multicast group and encoded with the unicast authentication policy based on AT 1's U-CSK, and encrypted with the GSK using the AES algorithm in counter mode, 630. The application server 170 receives and attempts to authenticate the call media from AT 1, 632. If the call media is not properly authenticated, the application server 170 ignores the media 634. Otherwise, if the call media is properly authenticated the application server 170 forwards a version of the call media that is encrypted with the multicast group's GSK to ATs 2 . . . N, 636. Note that the application server 170 need not decrypt the media as the application server 170 is merely forwarding the media to the target ATs. Each of ATs 2 . . . N receives the GSK-encrypted call media and applies the multicast authentication and encryption policy to the call media, 638. If ATs 2 . . . N do not properly authenticate the call media, ATs 2 . . . N ignore the call media, 642. Otherwise, if ATs 2 . . . N properly authenticate the call media, ATs 2 . . . N decrypt the media using the multicast group's GSK and replay the decrypted media, 644. Blocks 630 through 644 then repeat for a duration of the multicast session, or at least for so long as AT 1 remains a floor-holder for the multicast session.

At some later point in time, AT 1 determines to terminate the multicast session and stop speaking, 646. Accordingly, AT 1 generates a call termination message (e.g., an END message), applies the unicast authentication policy to the call termination message and then transmits the call termination message to the application server 170. At this point, AT 1 terminates the call, 648.

The application server 170 receives and attempts to authenticate the call termination message from AT 1, 650. If the call termination message is not properly authenticated, the application server 170 ignores the call termination message, 652. Otherwise, if the call termination message is properly authenticated, the application server 170 forwards a version of the call termination message that is authenticated with the multicast group's GSK to ATs 2 . . . N, 654, and then terminates the call, 656. Each of ATs 2 . . . N receives the GSK-authenticated call termination message and applies the multicast authentication policy to the call termination message, 658. If ATs 2 . . . N do not properly authenticate the call termination message, ATs 2 . . . N ignore the call termination message, 662. Otherwise, if ATs 2 . . . N properly authenticate the call termination message, ATs 2 . . . N terminate the call, 664.

In the event the GSK is compromised and/or a member is removed from the closed group, the GSK for the groups is updated as shown in FIG. 6. As explained in FIG. 6, the new GSK is effective only after the GSK time. The ATs and the application server 170 store at least two (2) GSKs for each group; namely, one current GSK and at least one future GSK. After the GSK time for a new future GSK becomes effective, the new future GSK replaces the current GSK and is used for authentication and encryption/decryption. If the future GSK's time comes into effect in the middle of the call, the ATs and the application server 170 wait until the end of the call to replace the current GSK with the future GSK.

As will be appreciated by one of ordinary skill in the art, while FIG. 6 illustrates a scenario where call originator AT 1 remains the floor-holder for the entirety of the multicast communication session, in other embodiments of the invention the floor may be released and transferred to another AT at least once during the multicast communication session. In this case, after the floor is re-allocated, blocks 630 through 644 may generally repeat for the new floor-holder and its associated target ATs as shown in blocks 630 through 644 for AT 1 as floor-holder and ATs 2 . . . N as target ATs, respectively.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of securing messages associated with a multicast communication session within a wireless communications system, comprising:
    determining to update at least one group session key (GSK) parameter for a given multicast group, the at least one GSK parameter configured to permit at least one of encryption, decryption, or authentication of multicast messaging exchanged between members of the given multicast group during a multicast communication session;
    sending a notification to a plurality of multicast group members of the given multicast group that an update of the at least one GSK parameter for the given multicast group is available;
    receiving, in response to the notification, a provisioning request from a given one of the plurality of multicast group members that requests the updated at least one GSK parameter, the provisioning request including information specific to the given multicast group member;
    generating the updated at least one GSK parameter by applying a hashing function based on a secret key that is not shared with the plurality of multicast group members, a randomly generated group-seed value and an identifier of the given multicast group;
    encrypting the updated at least one GSK parameter; and
    sending the encrypted, updated at least one GSK parameter to the given multicast group member.

2. The method of claim 1, further comprising:
    obtaining a private encryption key (PEK) based at least in part on the specific information provided from the given multicast group member,
    wherein the encrypting encrypts the updated at least one GSK parameter using the obtained PEK.

3. The method of claim 1, wherein the at least one GSK parameter includes a GSK and an associated GSK time.

4. The method of claim 3, wherein the associated GSK time corresponds to a time at which the GSK becomes valid for use.

5. The method of claim 3, wherein the specific information in the provisioning request includes at least one client-credential associated with the given multicast group member and a client-number-used-once (Cnonce) value generated by the given multicast group member.

6. The method of claim 5, wherein the sending of the encrypted, updated at least one GSK parameter includes sending the GSK, the associated GSK time, the identifier of the given multicast group, and the Cnonce value.

7. The method of claim 6, further comprising:
    obtaining a private encryption key (PEK) based at least in part on the specific information provided from the given multicast group member; and
    wherein the encrypting encrypts the updated at least one GSK parameter using the obtained PEK,
    wherein the PEK is generated based on the at least one client-credential and the Cnonce value.

8. The method of claim 7, wherein the obtaining includes:
    providing the at least one client-credential and the Cnonce value to an Authentication, Authorization, and Accounting (AAA) server; and
    receiving the PEK from the AAA server in response to the providing.

9. The method of claim 3, wherein the sending of the notification is performed during a period of low network activity as permitted by the associated GSK time.

10. The method of claim 1, wherein the hashing function corresponds to Hash-based Message Authentication Code (HMAC)-Secure Hash Algorithm (SHA) 256.

11. The method of claim 1, further comprising:
    during the multicast communication session involving two or more of the plurality of multicast group members, determining whether media from a current floor-holder of the multicast communication session complies with a unicast authentication policy based on a pre-established unicast client session key (U-CSK);
    if the determining determines the media is compliant, applying a multicast authentication and encryption policy to the media based on the updated at least one GSK parameter, and forwarding the media to at least one non-floor-holder of the multicast communication session.

12. The method of claim 1, further comprising:
    sending another notification, to an application server configured to arbitrate the multicast communication session, that indicates the update of the at least one GSK parameter for the given multicast group is available.

13. The method of claim 12, wherein the updated at least one GSK parameter is independently generated by the application server.

14. The method of claim 13, wherein the updated at least one GSK parameter is independently generated by the application server by applying a hashing function based on the secret key that is not shared with the plurality of multicast group members, the randomly generated group-seed value and the identifier of the given multicast group.

15. The method of claim 14, wherein a manner in which the generating generates the updated at least one GSK parameter is substantially the same as a manner in which the updated at least one GSK parameter is independently generated by the application server.

16. A method of securing messages associated with a multicast communication session within a wireless communications system, comprising:
    receiving a notification, at a given multicast group member belonging to a given multicast group, that an update of at least one group session key (GSK) parameter for the given multicast group is available, wherein the at least one GSK parameter is generated at one or more servers by applying a hashing function based on a secret key that is not shared with the given multicast group member, a randomly generated group-seed value and an identifier of the given multicast group, and is configured to permit at least one of encryption, decryption, or authentication of multicast messaging exchanged between members of the given multicast group during a multicast communication session;
    sending a provisioning request to request the updated at least one GSK parameter, the provisioning request including information specific to the given multicast group member; and
    receiving, in response to the provisioning request, an encrypted version of the updated at least one GSK parameter.

17. The method of claim 16, wherein the encrypted version of the updated at least one GSK parameter is encrypted in accordance with a private encryption key (PEK) derived at least in part from the specific information sent along with the provisioning request.

18. The method of claim 17, wherein the PEK is derived from at least one client-credential, a shared secret and a Cnonce value.

19. The method of claim 16, wherein the ecrypted version of the updated at least one GSK parameter includes a GSK and an associated GSK time.

20. The method of claim 19, wherein the associated GSK time corresponds to a time at which the GSK becomes valid for use.

21. The method of claim 19, wherein the information specific to the given multicast group member in the provisioning request includes at least one client-credential associated with the given multicast group member and a client-number-used-once (Cnonce) value generated by the given multicast group member.

22. The method of claim 21, wherein the receiving of the encrypted version includes receiving the GSK, the associated GSK time, the identifier of the given multicast group and the Cnonce value.

23. The method of claim 21, wherein the encyrpted version of the updated at least one GSK parameter is encrypted in accordance with a private encryption key (PEK) derived at least in part from the information specific to the given multicast group member sent along with the provisioning request, and wherein the PEK is derived from the at least one client-credential, a shared secret and the Cnonce value.

24. The method of claim 19, wherein the receiving of the notification is performed during a period of low network activity as permitted by the associated GSK time.

25. The method of claim 16, wherein the hashing function corresponds to Hash-based Message Authentication Code (HMAC)-Secure Hash Algorithm (SHA) 256.

26. The method of claim 16, further comprising:
during the multicast communication session involving two or more multicast group members including the given multicast group member,
determining whether media originating from a current floor-holder and forwarded from an application server that is configured to arbitrate the multicast communication session complies with a multicast authentication and encryption policy based on the updated at least one GSK parameter;
decrypting the media with the updated at least one GSK parameter; and
playing the media at the given multicast group member if the determining determines the media is compliant.

27. A server configured to secure messages associated with a multicast communication session within a wireless communications system, comprising:
means for determining to update at least one group session key (GSK) parameter for a given multicast group, the at least one GSK parameter configured to permit at least one of encryption, decryption, or authentication of multicast messaging exchanged between members of the given multicast group during a multicast communication session;
means for sending a notification to a plurality of multicast group members of the given multicast group that an update of the at least one GSK parameter for the given multicast group is available;
means for receiving, in response to the notification, a provisioning request from a given one of the plurality of multicast group members that requests the updated at least one GSK parameter, the provisioning request including information specific to the given multicast group member;
means for generating the updated at least one GSK parameter by applying a hashing function based on a secret key that is not shared with the plurality of multicast group members, a randomly generated group-seed value and an identifier of the given multicast group;
means for encrypting the updated at least one GSK parameter; and
means for sending the encrypted, updated at least one GSK parameter to the given multicast group member.

28. A communications device configured to secure messages associated with a multicast communication session within a wireless communications system, comprising:
means for receiving a notification, at a given multicast group member belonging to a given multicast group, that an update of at least one group session key (GSK) parameter for the given multicast group is available, wherein the at least one GSK parameter is generated at one or more servers by applying a hashing function based on a secret key that is not shared with the given multicast group member, a randomly generated group-seed value and an identifier of the given multicast, and is configured to permit at least one of encryption, decryption, or authentication of multicast messaging exchanged between members of the given multicast group during a multicast communication session;
means for sending a provisioning request to request the updated at least one GSK parameter, the provisioning request including information specific to the given multicast group member; and
means for receiving, in response to the provisioning request, an encrypted version of the updated at least one GSK parameter.

29. A server configured to secure messages associated with a multicast communication session within a wireless communications system, comprising:
one or more processors, comprising:
logic configured to determine to update at least one group session key (GSK) parameter for a given multicast group, the at least one GSK parameter configured to permit at least one of encryption, decryption, or authentication of multicast messaging exchanged between members of the given multicast group during a multicast communication session;
logic configured to send a notification to a plurality of multicast group members of the given multicast group that an update of the at least one GSK parameter for the given multicast group is available;
logic configured to receive, in response to the notification, a provisioning request from a given one of the plurality of multicast group members that requests the updated at least one GSK parameter, the provisioning request including information specific to the given multicast group member;
logic configured to generate the updated at least one GSK parameter by applying a hashing function based on a secret key that is not shared with the plurality of multicast group members, a randomly generated group-seed value and an identifier of the given multicast group;
logic configured to encrypt the updated at least one GSK parameter; and
logic configured to send the encrypted, updated at least one GSK parameter to the given multicast group member.

30. A communications device configured to secure messages associated with a multicast communication session within a wireless communications system, comprising:
logic configured to receive a notification, at a given multicast group member belonging to a given multicast group, that an update of at least one group session key (GSK) parameter for the given multicast group is available, wherein the at least one GSK parameter is generated at one or more servers by applying a hashing function based on a secret key that is not shared with the given multicast group member, a randomly generated group-seed value and an identifier of the given multicast, and is configured to permit at least one of encryption, decryption, or authentication of multicast messaging exchanged between members of the given multicast group during a multicast communication session;

logic configured to send a provisioning request to request the updated at least one GSK parameter, the provisioning request including information specific to the given multicast group member; and logic configured to receive, in response to the provisioning request, an encrypted version of the updated at least one GSK parameter.

31. A non-transitory computer-readable storage medium containing instructions stored thereon which, when executed by a server configured to secure messages associated with a multicast communication session within a wireless communications system, cause the server to perform operations, the instructions comprising:

program code to determine to update at least one group session key (GSK) parameter for a given multicast group, the at least one GSK parameter configured to permit at least one of encryption, decryption, or authentication of multicast messaging exchanged between members of the given multicast group during a multicast communication session;

program code to send a notification to a plurality of multicast group members of the given multicast group that an update of the at least one GSK parameter for the given multicast group is available;

program code to receive, in response to the notification, a provisioning request from a given one of the plurality of multicast group members that requests the updated at least one GSK parameter, the provisioning request including information specific to the given multicast group member;

program code to generate the updated at least one GSK parameter by applying a hashing function based on a secret key that is not shared with the plurality of multicast group members, a randomly generated group-seed value and an identifier of the given multicast group;

program code to encrypt the updated at least one GSK parameter; and program code to send the encrypted, updated at least one GSK parameter to the given multicast group member.

32. A non-transitory computer-readable storage medium containing instructions stored thereon which, when executed by a communications device configured to secure messages associated with a multicast communication session within a wireless communications system, cause the communications device to perform operations, the instructions comprising:

program code to receive a notification, at a given multicast group member belonging to a given multicast group, that an update of at least one group session key (GSK) parameter for the given multicast group is available, wherein the at least one GSK parameter is generated at one or more servers by applying a hashing function based on a secret key that is not shared with the given multicast group member, a randomly generated group-seed value and an identifier of the given multicast, and is configured to permit at least one of encryption, decryption, or authentication of multicast messaging exchanged between members of the given multicast group during a multicast communication session;

program code to send a provisioning request to request the updated at least one GSK parameter, the provisioning request including information specific to the given multicast group member; and program code to receive, in response to the provisioning request, an encrypted version of the updated at least one GSK parameter.

* * * * *